(12) United States Patent
Nakano et al.

(10) Patent No.: US 7,661,720 B2
(45) Date of Patent: Feb. 16, 2010

(54) CONNECTION STRUCTURE FOR DIFFERENT KINDS OF METAL TUBES

(75) Inventors: Yoshio Nakano, Himeji (JP); Toshiyuki Katayama, Himeji (JP); Takashi Yagi, Himeji (JP); Masamichi Matsui, Himeji (JP)

(73) Assignee: Nichirin Co., Ltd., Kobe-shi (JP)

( * ) Notice: Subject to any disclaimer, the term of this patent is extended or adjusted under 35 U.S.C. 154(b) by 3 days.

(21) Appl. No.: 11/995,271

(22) PCT Filed: Jul. 13, 2006

(86) PCT No.: PCT/JP2006/314323

§ 371 (c)(1),
(2), (4) Date: Jan. 10, 2008

(87) PCT Pub. No.: WO2007/007917

PCT Pub. Date: Jan. 18, 2007

(65) Prior Publication Data

US 2008/0197624 A1    Aug. 21, 2008

(30) Foreign Application Priority Data

Jul. 14, 2005    (JP) .............................. 2005-205731

(51) Int. Cl.
*F16L 33/00*    (2006.01)
(52) U.S. Cl. ...................... 285/242; 285/226; 285/256; 285/382.7
(58) Field of Classification Search ... 285/222.1–222.5, 285/225–226, 235–236, 239, 242, 256, 299–301, 285/370–371, 382, 382.7, 903, 915, 919
See application file for complete search history.

(56) References Cited

U.S. PATENT DOCUMENTS 1,138,946 A * 5/1915 Elliott ......................... 285/354
2,610,869 A * 9/1952 Allison ..................... 285/222.5

(Continued)

FOREIGN PATENT DOCUMENTS

JP    50 80816    7/1975

(Continued)

OTHER PUBLICATIONS

U.S. Appl. No. 11/551,044, filed Oct. 19, 2006, Katayama, et al.

*Primary Examiner*—Aaron M Dunwoody
*Assistant Examiner*—Fannie Kee
(74) *Attorney, Agent, or Firm*—Oblon, Spivak, McClelland, Maier & Neustadt, L.L.P.

(57) ABSTRACT

A structure connecting dissimilar metal tubes is a bellows tube and a metal tube made of stainless steel and aluminum respectively. The bellows tube has a reinforcement portion on its outer surface. The structure includes a nipple, the reinforcement portion, and a crimp collar fitted in that order to the outside of a straight tube portion of the bellows tube. The nipple is joined to the reinforcement portion and the metal tube. A sleeve is joined to the metal tube and the crimp collar. The nipple is bonded to the inner surface of the metal tube with a resin. End faces of the reinforcement portion and the crimp collar are in contact with or located close to an end face of the metal tube.

7 Claims, 3 Drawing Sheets

U.S. PATENT DOCUMENTS

| | | | | |
|---|---|---|---|---|
| 2,722,437 | A | * | 11/1955 | Phillips .................... 285/222.5 |
| 3,004,779 | A | * | 10/1961 | Cullen et al. ............. 285/222.5 |
| 5,335,945 | A | * | 8/1994 | Meyers ....................... 285/236 |
| 2002/0180209 | A1 | * | 12/2002 | Kariyama et al. ........... 285/256 |

FOREIGN PATENT DOCUMENTS

| | | |
|---|---|---|
| JP | 50 93619 | 8/1975 |
| JP | 07-310161 | 11/1995 |
| JP | 11 182767 | 7/1999 |
| JP | 2000 220781 | 8/2000 |
| JP | 2002-195474 | 7/2002 |
| JP | 2002-286180 | 10/2002 |
| JP | 2004-060672 | 2/2004 |
| JP | 2004 205017 | 7/2004 |
| JP | 2004 205018 | 7/2004 |
| JP | 2005-315381 | 11/2005 |

\* cited by examiner

CONNECTION STRUCTURE FOR DIFFERENT KINDS OF METAL TUBES

TECHNICAL FIELD

The present invention relates to connection structures for connecting dissimilar metal tubes. In particular, the present invention relates to a connection structure for connecting a vibration-absorbing hose used for the refrigerant circuit of an automotive air conditioner to the piping of the circuit.

BACKGROUND ART

Aluminum alloy pipes have recently been used in the piping of refrigerant circuits of automotive air conditioners to reduce the weight of automotive bodies; however, vibration in the compressor or the like may cause the piping to resonate, resulting in noise generation. In order to damp the piping resonance, composite hoses formed of multiple layers of rubber and resin have thus been incorporated in the middle of the piping.

In the meanwhile, HFC134a has been used in place of chlorofluorocarbons, which are ozone-destroying substances, as a refrigerant for automotive air conditioners. HFC134a has zero ozone depletion potential but has high global warming potential to accelerate global warming. Thus, as an alternative to HFC134a, the natural refrigerant CO2 is recommended because of low global warming potential.

However, in the use of the $CO_2$ refrigerant, the refrigerant circuit piping needs to withstand a temperature range of 140° C. to 180° C. and a pressure range of 13 to 15 MPa, as compared with 120° C. to 140° C. and 1.7 to 1.8 MPa in the use of the HFC134a refrigerant.

Instead of known composite hoses formed of the multiple layers of rubber and resin, which cannot withstand such high temperature and high pressure, a vibration-absorbing hose having a stainless-steel bellows has been developed.

The stainless-steel vibration-absorbing hose has a metal hose wall and has thus excellent gas permeability compared with known composite hoses formed of rubber and resins; hence, there is no leakage of the refrigerant therefrom. Thus, the stainless-steel vibration-absorbing hose is used for not only $CO_2$ refrigerant but also the current HFC134a refrigerant and the like in order to reduce the amount of leakage of the refrigerant to the exterior to zero.

However, when the vibration-absorbing hose is incorporated in the refrigerant circuit, the following problems arise: in the present circumstances, the bellows of the vibration-absorbing hose must be composed of stainless steel in view of processability and strength. On the other hand, the refrigerant circuit piping needs to be composed of aluminum (or an aluminum alloy) in view of a reduction in the weight of an automotive body and costs; hence, it is difficult to change the material from aluminum to stainless steel. Thus, the stainless-steel vibration-absorbing hose needs to be connected with the aluminum piping. However, it is significantly difficult to achieve a reliable joint with high strength and high hermeticity by only mechanically fitting or screwing these metal pipes. Furthermore, joining aluminum with stainless-steel by welding or brazing easily forms a brittle intermetallic compound in the joint; hence, also in this case, it is significantly difficult to achieve a reliable joint with high strength and high hermeticity.

As a method for joining a steel material to aluminum, a method including roughening a surface of a base material composed of a steel material to form irregularities, temporarily forming an aluminum layer, and forming a diffusion layer composed of an Fe—Al intermetallic compound by radio-frequency heating while pressing the aluminum layer from the surface side is disclosed (e.g., see Patent Document 2).

However, the method aims to improve the abrasive resistance and smoothness of the surface of the base material by forming a diffusion layer composed of the intermetallic compound. As long as the intermetallic compound is formed, a reliable joint with high strength and high hermeticity is not obtained.

To overcome the foregoing problems, the inventors have developed a joint structure for connecting dissimilar metal tubes disclosed in Japanese Patent Application No. 2004-135884.

As shown in FIG. 4, the joint structure according to this invention is obtained by crimping joining ends of a metal bellows tube A composed of stainless steel or the like and a metal tube B composed of a material, such as aluminum, different from that of the metal bellows pipe with a specific thermosetting resin R and then performing fixation by heat. Specifically, a straight tube portion (S) located at an end of the metal bellows tube A provided with a bellows (Q) is brazed to the inner surface of the base of a nipple (U). A reinforcement portion (W) is disposed between the outer surface of the base and a crimp collar (V) and fixed by crimping. The head (Y) of a socket (X) is fixed outside the nipple (U) by crimping. The thermosetting resin R is fed into the socket (X). An end of the metal tube B is inserted into a gap between the socket (X) and an end of the nipple (S) and fixed by crimping from the outside of the socket (X). The thermosetting resin is cured by heating. Thereby, the metal bellows tube A is joined to the metal tube B by fixing their joining ends.

As described above, it is possible to easily produce the joint structure for connecting dissimilar metal tubes, the structure having excellent strength and hermeticity.

The inventors successfully commercialized the joint structure on the basis of the prior invention. From the results of various studies, however, it was found that the joint structure had room for improvement.

That is, as shown in a figure, the joint structure includes a connection section having two crimp regions C1 and C2 and a non-crimped region F provided therebetween. The metal bellows tube A is connected to the metal tube B in the connection section. Lc1, Lc2, Lf, and Lt in parentheses represent lengths of the regions and the section. Lt corresponds to the entire length of the nipple (U). In the case where the non-crimped region F is not provided, in other words, in the case where a structure is used in which the head (Y) of the socket (X) is in contact with the crimp collar (V) and the crimp region C1 is continuous with the crimp region C2 while Lf is zero, the following problems arise: Stress concentrates on the boundary between the crimp regions C1 and C2 to reduce the strength of the nipple (U). Stress due to crimping in the crimp region C2 causes the crimp region C1 that has already been secured to deform or strain to loosen the fixation, leading to the detachment of the reinforcement portion (W) of the metal bellows tube (A) from between the crimp collar (V) and the nipple (U). Thus, the entire length Lt, corresponding to the connection section for connecting tubes A and B, of the nipple (U) needs to be longer by the length Lf (typically, 10 to 20 mm or more) of the non-crimped region F.

In the case where a refrigerant circuit connected to such dissimilar metal tubes is mounted on an automobile or the like, the piping structure needs to be minimized in view of other co-resident apparatuses, piping, and their components. Thus, the entire length Lt of the nipple (U) needs to be minimized. For example, the metal tube B composed of an aluminum alloy typically has a bend near a portion connected to the metal bellows tube A. A space occupied by the piping structure decreases as a bend starting point P is closer to the metal bellows tube A side, resulting in downsizing.

In the joint structure disclosed in the prior invention, a groove (Z) is formed before crimping in order to fix the socket (X) at a predetermined position on the nipple (U). Consequently, a groove-forming process is required, and the thickness of the nipple (U) must be increased by the depth of the groove. This disadvantageously increases production and material costs.

Patent Document 1: Japanese Unexamined Patent Application Publication No. 2002-195474

Patent Document 2: Japanese Unexamined Patent Application Publication No. 7-310161

DISCLOSURE OF INVENTION

Problems to be Solved by the Invention

In consideration of the above-described situation, it is an important object of the present invention to ensure connection strength and hermeticity in a connection structure for connecting dissimilar metal tubes and achieve downsizing.

Means for Solving the Problems

The present invention was accomplished to overcome the problems. A brief summary of features of the present invention will be described below.

1) A connection structure for connecting dissimilar metal tubes includes a metal bellows tube (A) having a reinforcement portion (3) disposed on the outer surface of the bellows (5), and a metal tube (B) composed of a material different from that of the bellows tube, the metal bellows tube (A) being integrally connected to the metal tube (B).

A connection section on the bellows tube side includes a straight tube portion (1) of the bellows tube (A), a nipple (2), the reinforcement portion (3), and a crimp collar (4), being fitted and secured to each other in that order from the inside of the tube. The nipple (2) has a base (2-1) joined to the reinforcement portion (3) and a connection end (2-2) extending to the metal tube (B) side farther than an end face of the crimp collar (4). The crimp collar (4) has a small-diameter portion (4-1) located on the metal tube (B) side and a large-diameter portion (4-2) located on the bellows side of the metal bellows tube, the small-diameter portion (4-1) being continuous with the large-diameter portion (4-2). A connection section on the metal tube (B) side includes a connection end (6) of the metal tube (B) and a sleeve (7) secured to the outer side of the connection end (6). The sleeve (7) has a base (7-1) joined to the connection end (6) and a fitting end (7-2) extending to the metal bellows tube (A) side. The fitting end (7-2) of the sleeve (7) on the metal tube (B) side is externally fitted on the small-diameter portion (4-1) of the crimp collar (4) on the metal bellows tube (A) side. The outer surface of the connection end (2-2) of the nipple (2) is bonded and fixed to the inner surface of the connection end (6) of the metal tube (B) with a thermosetting resin while an end face of the reinforcement portion (3) of the metal bellows tube (A) and the end face of the crimp collar (4) are in contact with or close to the end face of the connection end (6) of the metal tube (B).

2) In the connection structure for connecting dissimilar metal tubes described in item 1), the base (7-1) of the sleeve (7) is secured to the connection end (6) of the metal tube (B) by crimping.

3) In the connection structure for connecting dissimilar metal tubes described in item 1) or 2), the fitting end (7-2) of the sleeve (7) and the small-diameter portion (4-1) of the crimp collar (4) are not secured to each other by an external force.

4) In the connection structure for connecting dissimilar metal tubes described in any one of items 1) to 3), the metal bellows tube is a stainless-steel bellows tube, and the metal tube is an aluminum tube.

Advantages

The present invention provides a small connection structure, having excellent strength and hermeticity, for dissimilar metal tubes by a relatively easy technique. The present invention facilitates the application of a connection structure for connecting dissimilar metal tubes, i.e., a connection structure for connecting a stainless-steel bellows tube to an aluminum alloy tube, to $CO_2$ refrigerant circuit of an automotive air conditioner, thereby striking a balance between reductions in global environmental impact and the weight of an automotive body.

REFERENCE NUMERALS

Figure 1:
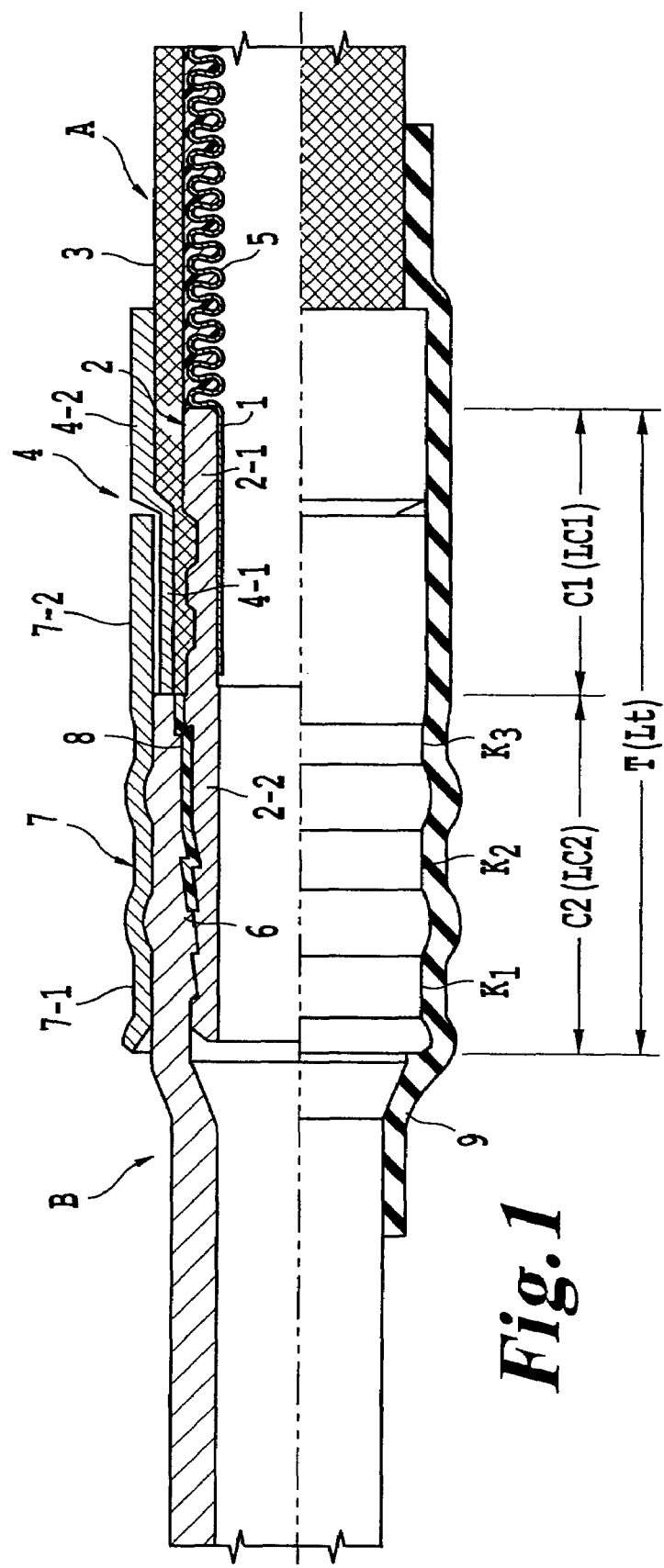
FIG. 1 is a fragmentary longitudinal-sectional view showing a connection structure for connecting a stainless-steel bellows tube and an aluminum tube according to an embodiment of the present invention.

A stainless-steel bellows tube
B aluminum tube
1 straight tube portion of bellows tube
2 stainless-steel nipple
2-1 base of nipple
2-2 connection end of nipple
3 reinforcement portion
4 crimp collar
4-1 small-diameter portion of crimp collar
4-2 large-diameter portion of crimp collar
5 bellows
6 connection end of aluminum tube
7 sleeve
7-1 base of sleeve
7-2 connection end of sleeve
8 epoxy resin
9 electrolytic corrosion preventing tube
C1, C2 crimp region
F non-crimped region
T connection section

BEST MODE FOR CARRYING OUT THE INVENTION

Embodiments of the present invention will be described in detail below with reference to the attached drawings.

Figure 2:
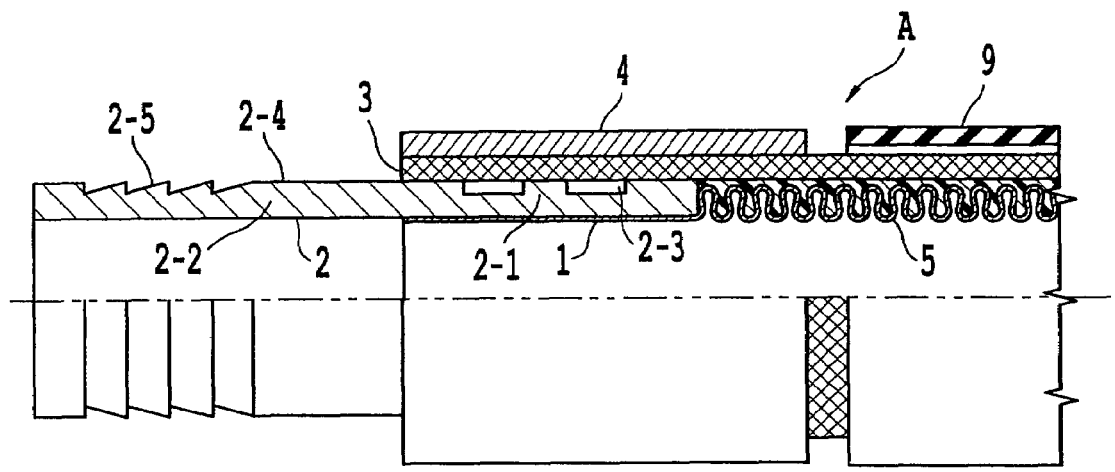
FIG. 2 is a fragmentary longitudinal-sectional view showing a structure of the stainless-steel bellows tube side according to the embodiment of the present invention.
Figure 3:
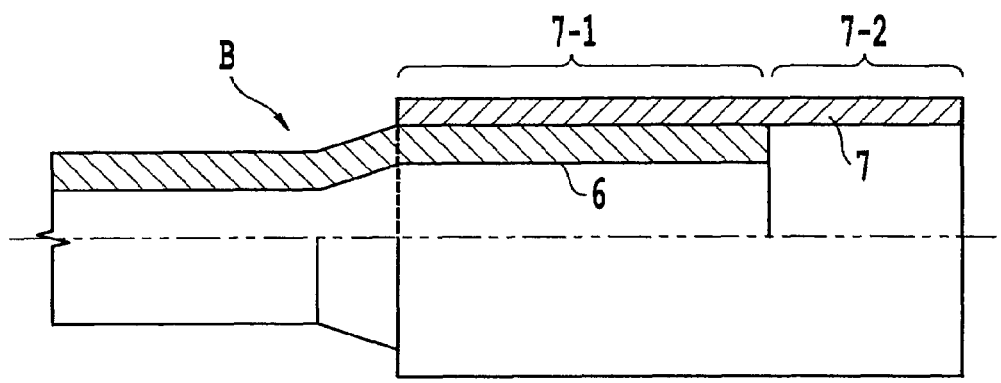
FIG. 3 is a fragmentary longitudinal-sectional view showing a structure of the aluminum tube side according to the embodiment of the present invention.

FIG. 1 shows a typical embodiment of the present invention and shows a preferred connection structure in which a metal bellows tube composed of stainless steel (hereinafter, also referred to as a "stainless-steel bellows tube" or "bellows tube") serving as a vibration-absorbing tube is connected to a metal tube composed of an aluminum alloy (hereinafter, also referred to as a "aluminum tube") serving as a circuit piping in the middle of a $CO_2$ refrigerant circuit for use in an automotive air conditioner. FIGS. 2 and 3 show connection parts of individual pipes before connection. FIG. 2 shows the stainless-steel bellows tube side. FIG. 3 shows the aluminum tube side.

The structure of the present invention will now be described in detail on the basis of FIGS. 2 and 3 including a process of forming the final connection structure shown in FIG. 1.

As shown in FIG. 2, the connection part of the stainless-steel bellows tube includes a stainless-steel bellows tube A including a bellows 5 composed of stainless steel disposed in the middle, a straight tube portion 1 disposed at an end, and a reinforcement portion 3, which is a 1braided layer of aramid fibers, covering the outside of them; a stainless-steel nipple 2, and a stainless-steel crimp collar 4. The nipple 2 has a base 2-1 joining to the reinforcement portion 3 and located on the bellows 5 side and has a connection end 2-2 extending from end faces of the reinforcement portion 3 and the crimp collar 4. The base 2-1 has two rows of square grooves 2-3 arranged lengthwise in the upper periphery thereof. A flat portion 2-4 is located on the base side of the upper periphery of the connection end 2-2. Four rows of sawtooth grooves 2-5 are arranged lengthwise in the end.

A process for forming the connection part of the bellows tube A is as follows: The straight tube portion 1 is inserted into the base 2-1 of the nipple 2 until the base 2-1 is brought into contact with an end of the bellows 5 in such a manner that the outer surface of the straight tube portion 1 is covered with the base 2-1. The inner surface of the base portion 2-1 of the nipple 2 is brazed to the outer surface of the straight tube portion 1 of the bellows tube A. The end face of the nipple 2 adjacent to the bellows 5 is brazed to a face of the bellows that it is in contact therewith. Thereby, the nipple 2 is secured to the bellows tube A. The reinforcement portion 3 is formed by braiding aramid fibers with a braiding machine. The crimp collar 4 having a length such that the crimp collar 4 sufficiently covers the region (length) of the brazed base portion 2-1 of the nipple 2 is prepared. The reinforcement portion 3 of the bellows tube A is inserted and fitted into the crimp collar 4 in such a manner that an end face of the reinforcement portion 3 is flush with an end face of the collar. The outer surface of a region of the crimp collar adjacent to the end is crimped by flat crimping with a fastening apparatus (crimping apparatus) to integrally secure the bellows tube A to the nipple 2.

As represented by the connection part of the bellows tube A shown in FIG. 1, crimping the crimp collar 4 reduces the diameter of the region (left half in the figure) of the crimp collar 4 adjacent to the end to form a small-diameter (smaller-diameter) portion 4-1. A region (right half in the figure) that is not crimped maintains the diameter and is defined as a large-diameter (larger-diameter) portion 4-2. That is, the crimp collar 4 has a step in the middle thereof and a change in diameter at the step. The crimping results in a reduction in the thickness of the end of the reinforcement portion 3 in the crimped region. Furthermore, the square grooves 2-3 in the base 2-1 of the nipple is filled with the reinforcement portion 3. Thereby, the reinforcement portion 3 is strongly fastened between the crimp collar 4 and the nipple 2. There is no risk of looseness due to slippage or detachment. Valley portions of the bellows tube A may be filled with rubber or a thermoplastic elastomer as a buffer of the bellows before braiding aramid fibers.

On the other hand, the connection part of the aluminum tube includes a connection end 6 of the aluminum tube B and a sleeve 7 outside the connection end, as shown in FIG. 3.

A process for forming the connection part of the aluminum tube B is as follows: The diameter of the end of the aluminum tube B is increased so as to be slightly larger than the outer diameter of the connection end 2-2 of the nipple 2 of the stainless-steel bellows tube A to form the connection end 6. The sleeve 7, composed of stainless steel, having an inner diameter slightly larger than the outer diameter of the connection end 6, and having a length equal to the sum of the length of the connection end 2-2 of the nipple 2 and the small-diameter portion 4-1 of the crimp collar 4 is prepared. The connection end 6 of the aluminum tube B is inserted into the sleeve 7. They are loosely, slidably fitted. The sleeve 7 includes a base 7-1 fitted to the connection end 6 of the aluminum tube B and a fitting end 7-2 extending away from the connection end 6, the base 7-1 being continuous with the fitting end 7-2. As described below, the base 7-1 is a portion to be crimped together with the aluminum tube B (connection end 6) and subjected to an external force. The fitting end 7-2 is not crimped and thus is a portion that is not subjected to the external force.

Mainly referring to FIG. 1, a method for integrally connecting these resulting connection parts of the stainless-steel bellows tube A and the aluminum tube B will be described below.

An epoxy resin (adhesive) 8 having a glass transition temperature of 140° C. or higher is applied to the outer surface of the connection end 2-2 of the nipple 2 of the stainless-steel bellows tube. In this embodiment, a region to which the adhesive is applied is the flat portion of the connection end 2-2 on the base side (there is no need to apply to the entire surface of the connection end including the sawtooth grooves adjacent to the tip).

After the application of the epoxy resin (adhesive), the nipple 2 of the bellows tube A is inserted into a prepared electrolytic corrosion preventing tube 9 composed of silicone rubber having heat shrinkability before an operation of connecting the bellows tube A with the aluminum tube B. As shown in FIG. 2, the electrolytic corrosion preventing tube 9 is loosely attached behind the crimp collar 4 so as to form a gap between the tube 9 and the reinforcement portion 3.

The bellows tube A is inserted into the aluminum tube B in such a manner that the connection end 6 of the aluminum tube B comes into contact with the end face of the reinforcement portion 3 secured to the outer surface of the base 2-1 of the nipple of the bellows tube A and the end face of the small-diameter portion 4-1 of the crimp collar 4. Simultaneously, the small-diameter portion 4-1 of the crimp collar 4 is inserted into the fitting end 7-2 of the sleeve 7 fitted to the connection end 6. As a result, the fitting end 7-2 covers the small-diameter portion 4-1 and is in contact with the end face constituting the step located on the sleeve 7 side of the large-diameter portion 4-2. Thereby, the fitting end 7-2 of the sleeve 7 disposed on the outer side is loosely fitted to the small-diameter portion 4-1 of the crimp collar 4 disposed on the inner side.

Then the periphery of the base 7-1 of the sleeve 7 is press-bonded to the outer surface of the connection end 6 of the aluminum tube B by crimping with a fastening apparatus (crimping apparatus) at three positions located lengthwise (three-step crimping). K1 to K3 represent three depressions formed by the crimping on the outer surface of the sleeve 7.

Crimping the sleeve 7 allows the outer surface of the connection end 6 of the soft aluminum tube B to plastically deform along the shape of the outer surface of the base 7-1 of the sleeve 7, thus resulting in strong bonding. Furthermore, the connection end 6 of the aluminum tube B deforms plastically and is bonded to the outer surface of the connection end 2-2 of the nipple 2 disposed on the inner side thereof. In particular, the aluminum inner surface of the connection end 6 is in close contact while the sawtooth grooves 2-5 are engaged in the aluminum inner surface of the connection end 6. Therefore, excellent connection strength is maintained between the nipple 2 of the stainless-steel bellows tube A and the aluminum tube B.

The crimping simultaneously allows the epoxy resin 8 applied to the outer surface of the connection end 2-2 of the nipple 2 to flow and uniformly fill the epoxy resin 8 into the gap between the outer surface of the connection end 2-2 and the inner surface of the connection end 6 of the aluminum tube B fitted to the connection end 2-2. Unlike FIG. 4, a resin-filled region is expanded from an application region on the flat surface of the connection end 2-2 toward the tip and reaches a position in the middle of the area of the sawtooth grooves 2-5.

Figure 4:
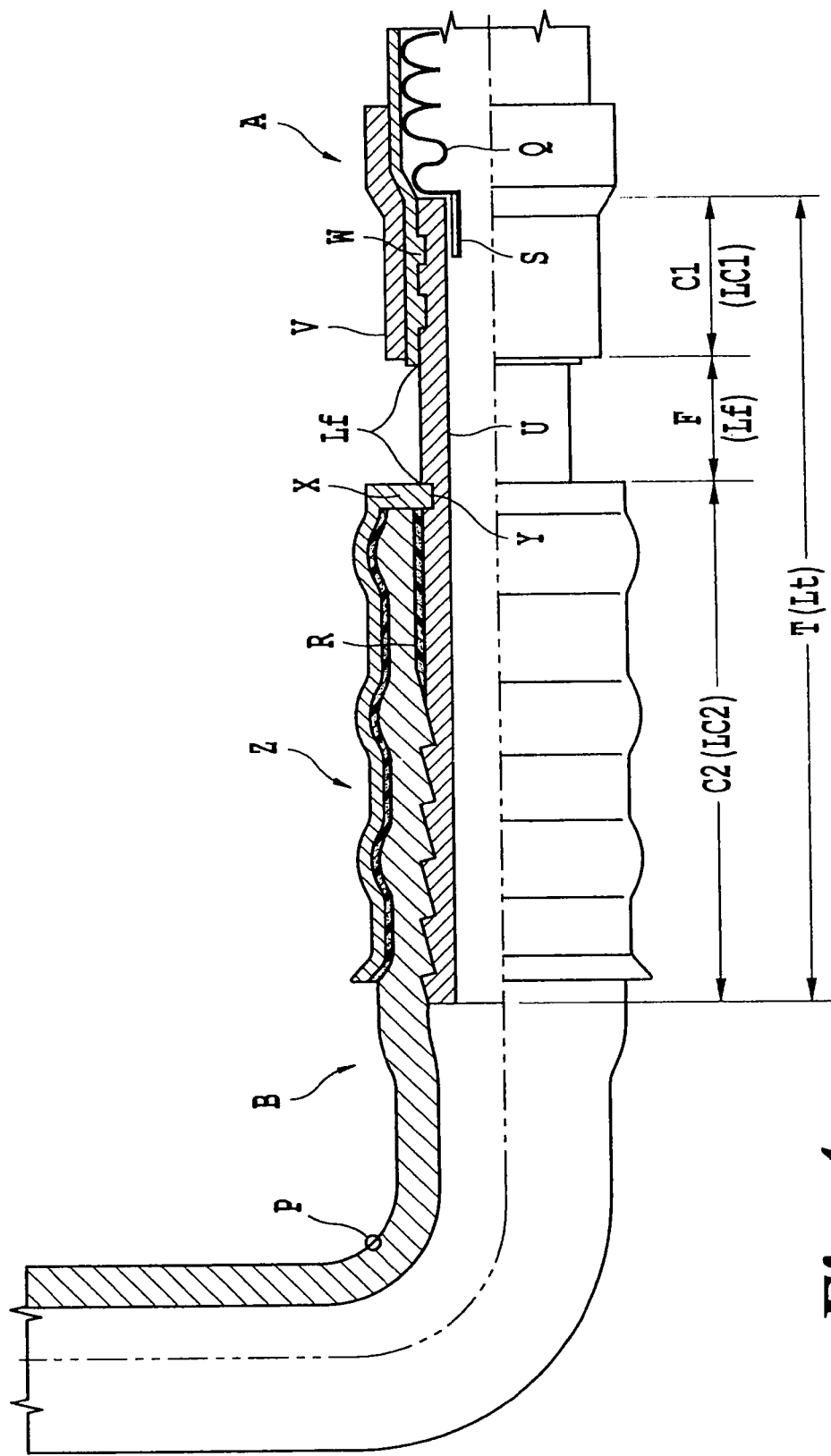
FIG. 4 is a fragmentary longitudinal-sectional view showing a connection structure for connecting a stainless-steel bellows tube and an aluminum tube according to an embodiment of the prior invention.

In contrast, even when the sleeve 7 is crimped, as described above, the external force generated by crimping is applied to only the base 7-1 of the sleeve 7 but is not applied to the fitting end 7-2 loosely fitted to the small-diameter portion 4-1 of the crimp collar 4. Thus, unlike the above-described prior invention in which the socket is used as a connection member of the aluminum tube B as shown in FIG. 4, the following problems are eliminated: stress concentration caused by crimping the crimp collar and the socket, and crimping the socket causes the crimped region that has already been secured with the crimp collar to deform or strain to loosen the fixation.

In this embodiment shown in FIG. 1, the two tubes are fitted while the end face of the connection end 6 of the aluminum tube B is in contact with or close to the end face of the crimp collar 4 (small-diameter portion 4-1) of the bellows tube A. This structure results in a reduction in the length Lt (length of the nipple) of the connection section of the two tubes. That is, this structure eliminates the non-crimped region F of the nipple (U) shown in FIG. 4. In this structure, the crimp region C1 is substantially continuous with the crimp region C2. In other words, the length Lf is zero. Thus, the length Lt is reduced by the length Lf. Furthermore, the length Lt is reduced by the thickness of the head (Y) of the socket in the prior invention in addition to the length Lf. A shorter length for connection downsizes the entire structure of the piping of the bellows tube A and the aluminum tube B, thereby reducing the space occupied by the piping in an automobile body and facilitating installation.

The sleeve 7 can be positioned at a predetermined position by bringing the end face of the fitting end 7-2 into contact with the end face of the large-diameter portion 4-2 of the crimp collar 4. Thus, the crimping position on the base 7-1 can be advantageously determined. Furthermore, the crimping position can be readily changed by adjusting the length of the sleeve 7.

The outer diameter of the sleeve 7 is substantially equal to the outer diameter of the large-diameter portion 4-2 of the crimp collar. The appearance of the connection section is more even than that of the structure of the prior invention. Thus, this structure also has excellent appearance.

In addition, unlike the structure of the prior invention, the socket is not used as the connection member. Since the head is fixed to the nipple before crimping, the operation of forming a groove in the periphery of the nipple is not required. Furthermore, the nipple does not need to have a large thickness. Thus, the production and material costs are advantageously low.

After completion of the crimping of the sleeve 7, the electrolytic corrosion preventing tube 9 attached behind the crimp collar 4 is moved to the aluminum tube side and attached so as to sufficiently cover the connection section T and portions around the connection section T of both tubes. In FIG. 1, only the lower side of the electrolytic corrosion preventing tube 9 is shown. The upper side thereof is omitted.

Both connection parts are subjected to heat treatment with a hot air heater (oven) or the like at 140° C. to 160° C. to cure the epoxy resin filled in the gap, thereby terminating the connection between the stainless-steel bellows tube A and the aluminum tube B according to the present invention and completing the connection structure (joint).

The heat treatment results in a resin film having high adhesive strength; hence, the aluminum tube B is connected to the nipple 2 of the bellows tube A with high hermeticity.

The electrolytic corrosion preventing tube 9 attached is heat shrunk and comes into close contact with the outer surfaces of both tubes, thereby effectively preventing the occurrence of corrosion due to the penetration of water or the like from the outside into the boundary between stainless steel and aluminum.

The embodiment shown in the figures has been briefly described above. To facilitate understanding and implementation of the present invention, the present invention including other embodiments will be comprehensively described below.

With respect to dissimilar metal tubes to be connected in the present invention, examples of one tube (metal bellows tube) include metal bellows tubes (including bellows tubes and corrugated tubes) each having a reinforcement portion, flexibility, elasticity, and increased strength, such as pressure resistance and durability, owing to the reinforcement portion. Examples of the other tube (metal tube) include usual metal tubes that do not having bellows and are composed of materials different from those of the bellows tubes. The former is composed of stainless steel in the embodiment. Alternatively, steel other than stainless steel, another metal, or an alloy thereof may be used. The latter is composed of an aluminum alloy in the embodiment. Alternatively, another metal other than aluminum or an alloy may be used.

The laminar covering formed by knitting aramid fibers in a braiding manner on the outer surface of the bellows is exemplified as the reinforcement portion of the metal bellows tube. With respect to the fibers, vinylon, nylon, polyester, steel wire, and the like may be used. Knitting is not limited to braiding. A resin other than fibers or a rubber tube may be used for the reinforcement portion.

In the production of the connection part of the aluminum tube, the diameter-increasing treatment (tube expansion) of the end is performed in the embodiment. The necessity and type of such processing are determined depending on the outer diameter of the connection part (outer diameter of the nipple) of the bellows tube A. In some cases, such preprocessing is not required. Alternatively, diameter-reducing treatment is required, in some cases. In the present invention, it should be appreciated that the diameter-increasing treatment is not always necessary.

As a thermosetting resin for bonding the outer surface of the nipple of the metal bellows tube to the inner surface of the connection end of the aluminum tube, the epoxy resin used in the embodiment is preferred because it has excellent adhesive strength and maintains hermeticity at a high level. Alternatively, polyimide resins and the like may be used. Examples of the epoxy resin include alicyclic, glycidyl ether, glycidyl ester, and glycidyl amine types. Examples of the alicyclic epoxy resin include alicyclic diepoxy acetals, alicyclic diepoxy adipates, alicyclic diepoxy carboxylates, and vinylcyclohexene dioxide. Examples of the polyimide resin include pyromellitic dianhydride (PMDA), biphenyltetracarboxylic dianhydride (BPDA), and benzophenonetetracarboxylic dianhydride (BTDA).

With respect to the characteristics of the thermosetting resin, to maintain the adhesive strength and hermeticity of the connected tubes at high temperatures, a thermosetting resin having a higher glass transition temperature is preferred. In particular, in the case where the resin is used in the refrigerant circuit of an automotive air conditioner, the resin preferably has a glass transition temperature of 120° C. or higher and particularly 140° C. or higher.

Preferably, the adhesion region of the thermosetting resin is the whole gap between the outer surface of the nipple and the inner surface of the connection end of the aluminum tube. As described in the embodiment, there is no problem when 30% or more of the entire gap serves as the adhesion region and the adhesion region extends from the end face of the connection end of the aluminum tube toward the tip of the connection end of the nipple.

Bonding by also charging the thermosetting resin into the gap between the inner surface of the fitting end of the sleeve and the outer surface of the small-diameter portion of the crimp collar is more preferred from the viewpoint of further improvement of the connection strength and hermeticity.

In the above-described embodiment, when the bellows tube is connected to the aluminum tube, the connection end of the nipple is inserted into the connection end of the aluminum tube in such a manner that the end face of the connection end thereof comes into contact with the end face of the small-diameter portion of the crimp collar (and the end face of the reinforcement portion 3) secured to the outside of the nipple, before setting and crimping the sleeve. The present invention includes the case where the connection end of the nipple is inserted into the connection end of the aluminum tube in such a manner that the end face of the connection end of the nipple is close to the end face of the small-diameter portion of the crimp collar, i.e., in such a manner that a predetermined gap is formed between both end faces.

Specifically, the term "close" refers to the gap having 5 mm or less. The gap having 5 mm or less does not affect connection strength or hermeticity and successfully achieves the object of the present invention which realizes downsizing by reducing the length of the connection section. Furthermore, the formation of the gap has an active meaning. In a state in which both end faces are in contact with each other without the formation of the gap, for example, in the case where a significantly large amount of crimping must be required, crimping the sleeve causes the expansion of the connection end of aluminum, thereby pressing the end face of the stainless-steel crimp collar. This stress may cause the deformation or strain of the region that has already been crimped with the crimp collar. In such a case, the gap functions as a cushion to absorb the expansion of aluminum and thus eliminates adverse effects on the region crimped with the crimp collar.

With respect to a method of crimping the sleeve, in the above-described embodiment, the outer surface of the base is crimped at three positions. The method is not limited thereto. Flat crimping or a method of crimping the sleeve at two positions may be employed. In view of the penetration and uniform charging of the resin into the gap (adhesion region) and permanent set-in fatigue of the nipple, most preferably, crimping is performed at three positions as in the embodiment.

With respect to the relationship between the lengths of the base and fitting end of the sleeve, the ratio of the length of the base to the length of fitting end is preferably in the range of 3:1 to 2:1. The length of the fitting end 7-2 is specified as the minimum length required for strongly connecting the reinforcement portion 3 with the nipple 2-1. In view of the ratio relative to the length, an excessively short length of the base 7-1 results in a reduction in bond strength. An excessively long length results in a reduction in the degree of flexibility in actual car. Particularly preferably, therefore, the ratio is in the range of 1:1 to 2:1.

In the above-described embodiment, the final connection structure for connecting the stainless-steel bellows tube with the aluminum tube is a structure in which the electrolytic corrosion preventing tube composed of silicone rubber having heat shrinkability is in close contact with the periphery of the connection section of the stainless-steel bellows tube and the aluminum tube. Another rubber other than silicone rubber (e.g., EP rubber or nitrile-butadiene rubber) or a resin (e.g., polyethylene, a fluorocarbon resin, polyimide, or tetrafluoroethylene) may be used for the electrolytic corrosion preventing tube as long as it has excellent adhesion by heat shrinkage, securely precludes the penetration of water into the connection section, and prevents electrolytic corrosion.

The invention claimed is:

1. A connection structure for connecting dissimilar metal tubes, comprising:
   a metal bellows tube having a reinforcement portion disposed on an outer surface of bellows of the metal bellows tube, and
   a metal tube composed of a material different from that of the metal bellows tube, the metal bellows tube being integrally connected to the metal tube,
   wherein a connection section on a metal bellows tube side includes
      a straight tube portion of the metal bellows tube,
      a nipple,
      the reinforcement portion, and
      a crimp collar, being fitted and secured to each other in that order from an inside of the tube,
   the nipple having a base joined to the reinforcement portion and a connection end extending to a metal tube side farther than an end face of the crimp collar, and
   the crimp collar having a smaller-diameter portion extending to the metal tube side and a larger-diameter portion located on the metal bellows tube side of the metal bellows tube, the smaller-diameter portion of the crimp collar being continuous with the larger-diameter portion of the crimp collar, and
   wherein a connection section on the metal tube side includes
      a connection end of the metal tube and
      a sleeve secured to an outer side of the connection end of the metal tube,
   the sleeve having a base joined to the connection end of the metal tube and a fitting end extending to the metal bellows tube side, and
   the fitting end of the sleeve extending to the metal bellows tube side being externally fitted on the smaller-diameter portion of the crimp collar extending to the metal tube side, and an outer surface of a connection end of the nipple being bonded and fixed to an inner surface of the connection end of the metal tube with a thermosetting resin while an end face of the reinforcement portion of the metal bellows tube and the end face of the crimp collar are in contact with or close to an end face of the connection end of the metal tube, and wherein the larger-diameter portion is larger than the smaller-diameter portion.

2. The connection structure for connecting the dissimilar metal tubes according to claim 1, wherein the metal bellows tube is a stainless-steel bellows tube, and the metal tube is an aluminum tube.

3. The connection structure for connecting the dissimilar metal tubes according to claim 1, wherein the fitting end of the sleeve and the smaller-diameter portion of the crimp collar are not secured to each other by an external force.

4. The connection structure for connecting the dissimilar metal tubes according to claim 3, wherein the metal bellows tube is a stainless-steel bellows tube, and the metal tube is an aluminum tube.

5. The connection structure for connecting the dissimilar metal tubes according to claim 1, wherein the base of the sleeve is secured to the connection end of the metal tube by crimping.

6. The connection structure for connecting the dissimilar metal tubes according to claim 5, wherein the fitting end of the sleeve and the smaller-diameter portion of the crimp collar are not secured to each other by an external force.

7. The connection structure for connecting the dissimilar metal tubes according to claim 5, wherein the metal bellows tube is a stainless-steel bellows tube, and the metal tube is an aluminum tube.

* * * * *